United States Patent
Chen et al.

(10) Patent No.: US 11,395,160 B2
(45) Date of Patent: Jul. 19, 2022

(54) ENERGY CONSUMPTION OPTIMIZATION METHOD AND SYSTEM FOR RADIO ACCESS SPECTRUM-FLEXIBLE OPTICAL NETWORK

(71) Applicant: SOOCHOW UNIVERSITY, Suzhou (CN)

(72) Inventors: Bowen Chen, Suzhou (CN); Gangxiang Shen, Suzhou (CN); Mingyi Gao, Suzhou (CN); Lian Xiang, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 26 days.

(21) Appl. No.: 16/981,797

(22) PCT Filed: Dec. 25, 2019

(86) PCT No.: PCT/CN2019/128303
§ 371 (c)(1),
(2) Date: Sep. 17, 2020

(87) PCT Pub. No.: WO2020/248574
PCT Pub. Date: Dec. 17, 2020

(65) Prior Publication Data
US 2021/0258802 A1    Aug. 19, 2021

(30) Foreign Application Priority Data
Jun. 12, 2019    (CN) .......................... 201910506488.8

(51) Int. Cl.
*H04W 24/02*    (2009.01)
*H04W 16/18*    (2009.01)

(52) U.S. Cl.
CPC ........... *H04W 24/02* (2013.01); *H04W 16/18* (2013.01)

(58) Field of Classification Search
USPC ....................................................... 370/252
See application file for complete search history.

(56) References Cited

U.S. PATENT DOCUMENTS 9,854,044 B2 *   12/2017   Kazmi ................. H04L 67/141
2005/0195749 A1 *   9/2005   Elmasry ................ H04L 41/12
                                                           370/252

(Continued)

FOREIGN PATENT DOCUMENTS

CN      105682195 A    6/2016
CN      107426110 A    12/2017

(Continued)

OTHER PUBLICATIONS

Bowen Chen et al. "Energy-Efficient Traffic Grooming in 5G C-RAN Enabled Flexible Bandwidth Optical Networks" Asia Communications and Photonics Conference (ACP) 2017 (Dec. 31, 2017).

*Primary Examiner* — Gregory B Sefcheck
*Assistant Examiner* — Majid Esmaeilian
(74) *Attorney, Agent, or Firm* — SZDC Law P.C.

(57) ABSTRACT

The present invention provides an energy consumption optimization method and system for a radio access spectrum-flexible optical network. The method includes: acquiring a set of traffic demands; obtaining the minimum number of occupied remote radio heads (RRH) and the minimum number of occupied baseband unit (BBU) ports of the traffic demands based on a traffic grooming algorithm; and solving an objective function based on the constraints of the objective function of traffic grooming energy consumption optimization, to implement transmission for the traffic demands.

2 Claims, 1 Drawing Sheet

(56) References Cited

U.S. PATENT DOCUMENTS

| | | | |
|---|---|---|---|
| 2013/0322235 A1* | 12/2013 | Khoryaev | H04L 5/0073 |
| | | | 370/229 |
| 2014/0031049 A1* | 1/2014 | Sundaresan | H04W 24/02 |
| | | | 455/446 |
| 2014/0185531 A1 | 7/2014 | Liu et al. | |
| 2016/0004981 A1* | 1/2016 | Wang | G06Q 10/1095 |
| | | | 705/6 |
| 2016/0294699 A1* | 10/2016 | Kodialam | H04L 47/125 |
| 2017/0237484 A1* | 8/2017 | Heath | H04Q 11/0066 |
| | | | 398/26 |
| 2019/0089428 A1* | 3/2019 | Bethanabhotla | H04B 7/0608 |
| 2020/0196194 A1* | 6/2020 | Kozat | H04W 28/06 |

FOREIGN PATENT DOCUMENTS

| | | |
|---|---|---|
| CN | 109245918 A | 1/2019 |
| CN | 110234128 A | 9/2019 |

\* cited by examiner

ENERGY CONSUMPTION OPTIMIZATION METHOD AND SYSTEM FOR RADIO ACCESS SPECTRUM-FLEXIBLE OPTICAL NETWORK

This application is the National Stage Application of PCT/CN2019/128303, filed on Dec. 25, 2019, which claims priority to Chinese Patent Application No. 201910506488.8, filed on Jun. 12, 2019, which is incorporated by reference for all purposes as if fully set forth herein.

FIELD OF THE INVENTION

The present invention relates to the field of signal processing technology, and more particularly to an energy consumption optimization method and system for a radio access spectrum-flexible optical network.

DESCRIPTION OF THE RELATED ART

With the development of traffic requirements such as the Internet, big data, data centers, ultra-high-definition, artificial intelligence, virtual reality, and autopilot, current mobile network bandwidth services and transmission rate are hardly adequate to adapt to service development requirements, and mobile networks urgently need to be upgraded in many aspects such as network bandwidths, rates, transmission latency, and efficiency.

Fifth-generation (5G) mobile networks emerge accordingly. 5G mobile networks will not only provide a variety of networking services such as enhanced mobile broadband, media delivery, industrial application, and autopilot and can also satisfy large-bandwidth and low-latency application services. To transmit data services of mobile networks, an optical communication network plays an increasingly important role in mobile fronthaul and backhaul networks.

Therefore, it is a problem to be urgently resolved to improve the energy consumption efficiency of 5G mobile networks to implement optimized power consumption of radio access spectrum-flexible optical networks.

SUMMARY OF THE INVENTION

The present invention resolve the energy consumption efficiency problem of a large-bandwidth, low-latency, efficient 5G optical access mobile network. By means of a traffic grooming method, an integer linear programming model with minimum power consumption is provided to implement optimized power consumption of radio access spectrum-flexible optical networks.

In order to solve the technical problems, in one aspect, the present invention provides an energy consumption optimization method for a radio access spectrum-flexible optical network, comprising:

acquiring a set of traffic demands;

obtaining the minimum number of occupied remote radio heads (RRHs) and the minimum number of occupied baseband unit (BBU) ports of the traffic demands based on a traffic grooming algorithm; and solving an objective function based on the constraints of the objective function of traffic grooming energy consumption optimization, to implement transmission for the traffic demands, wherein an expression of the objective function is:

Minimize $\sum_{i \in A} \sum_{j \in R} P_{RRH} \cdot X_{i,j} \cdot T + \sum_{i \in A} \sum_{k \in B} P_{BBU} \cdot Y_{i,k} \cdot T$, wherein the expression, $P_{RRH}$ is a unit power consumption of a RRH; $X_{i,j}$ is a binary variable, wherein if a $j^{th}$ RRH in an $i^{th}$ base station is occupied, $X_{i,j}$ is 1, or otherwise, $X_{i,j}$ is 0; T represents a unit time; $P_{BBU}$ is a unit power consumption of a BBU port; $Y_{i,k}$ is a binary variable, wherein if a $j^{th}$ BBU port in an $i^{th}$ base station is occupied, $Y_{i,k}$ is 1, or otherwise, $Y_{i,k}$ is 0; A is a set of base station areas; i is an index of an $i^{th}$ area in a base station; j is an index of a $j^{th}$ RRH; and k is an index of a $k^{th}$ BBU port; and the constraints of the objective function include: (1) it is ensured that a bandwidth traffic requirement of the traffic demand is less than or equal to a capacity of a $j^{th}$ RRH in an $i^{th}$ base station; (2) it is ensured that a bandwidth traffic requirement of the traffic demand is less than or equal to a capacity of a $k^{th}$ BBU port in an $i^{th}$ base station; (3) a bandwidth traffic requirement of the traffic demand is less than or equal to a capacity provided by a RRH from a source node area (i=s) to a destination node area (i=d); (4) a bandwidth traffic requirement of the traffic demand is less than or equal to a capacity provided by a BBU port from a source node area (i=s) to a destination node area (i=d); (5) it is ensured on a source node s or a destination node d that a bandwidth traffic requirement of each traffic demand (s, d) is less than or equal to a capacity provided by a RRH in a $j^{th}$ base station; and (6) it is ensured on a source node s or a destination node d that a bandwidth traffic requirement of each traffic demand (s, d) is less than or equal to a capacity provided by the $k^{th}$ BBU port.

Preferably, the obtaining the minimum number of occupied RRHs and the minimum number of occupied BBU ports of the traffic demands based on a traffic grooming algorithm comprises:

collecting and aggregating traffic information according to a traffic requirement of each traffic demand in a local cell base station; and dividing the aggregated traffic information into different data rates, wherein the data rates are the same as the rates carried by RRHs with front-end functionalities in a one-to-one correspondence.

Preferably, the solving an objective function based on the constraints of the objective function of traffic grooming energy consumption optimization includes:

acquiring an input constant, a variable index, and a variable parameter of the objective function; and solving the objective function based on the input constant, the variable index, and the variable parameter, wherein the input constant includes:
1) $P_{RRH}$ is a unit power consumption of a RRH;
2) $P_{BBU}$ is a unit power consumption of a BBU port;
3) $RRHC_{i,j}$ is a capacity of a $j^{th}$ RRH in an $i^{th}$ area;
4) $BBUC_{i,k}$ is a capacity of a $k^{th}$ BBU port in an $i^{th}$ area;
5) $\Lambda^{s,d}$ is the traffic flow from a source node s to a destination node d;
6) (s, d) is a traffic demand from a source node s to a destination node d, wherein s≠d;
7) CR is a given set of traffic demands;
8) A is a set of base station areas;
9) R is a set of RRHs in one base station;
10) B is a set of BBU ports in one area; and
11) T represents a unit time;

the variable index includes:
1) i is an index of an $i^{th}$ area in a base station;
2) j is an index of a $j^{th}$ RRH;
3) k is an index of a $k^{th}$ BBU port; and
4) s and d are indices of a source node s and a destination node d for a traffic demand; and the variable parameter includes:
1) $X_{i,j}$ is a binary variable, wherein if a $j^{th}$ RRH in an $i^{th}$ base station is occupied, $X_{i,j}$ is 1, or otherwise, $X_{i,j}$ is 0;

2) $Y_{i,k}$ is a binary variable, wherein if a $j^{th}$ BBU port in an $i^{th}$ base station is occupied, $Y_{i,k}$ is 1, or otherwise, $Y_{i,k}$ is 0;

3) $x_{i,j}^{s,d}$ is a binary variable, wherein if a traffic demand (s, d) occupies a $j^{th}$ RRH in an $i^{th}$ base station, $x_{i,j}^{s,d}$ is 1, or otherwise, $x_{i,j}^{s,d}$ is 0; and 4) $y_{i,k}^{s,d}$ is a binary variable, wherein if a traffic demand (s, d) occupies the $k^{th}$ BBU port in an $i^{th}$ base station, $y_{i,k}^{s,d}$ is 1, or otherwise, $y_{i,k}^{s,d}$ is 0.

In another aspect, the present invention provides an energy consumption optimization system for a radio access spectrum-flexible optical network, comprising:

a traffic demand acquisition module, configured to acquire a set of traffic demands;

an operation module, configured to obtain the minimum number of occupied remote radio heads (RRHs) and the minimum number of occupied baseband unit (BBU) ports of the traffic demands based on a traffic grooming algorithm; and a transmission module, configured to solve an objective function based on the constraints of the objective function of traffic grooming energy consumption optimization, to implement transmission for the traffic demand, wherein an expression of the objective function is:

Minimize $\Sigma_{i \in A} \Sigma_{j \in R} P_{RRH} \cdot X_{i,j} \cdot T + \Sigma_{i \in A} \Sigma_{k \in B} P_{BBU} \cdot T$, wherein in the expression, $P_{RRH}$ is a unit power consumption of a RRH; $X_{i,j}$ is a binary variable, wherein if a $j^{th}$ RRH in an $i^{th}$ base station is occupied, $X_{i,j}$ is 1, or otherwise, $X_{i,j}$ is 0; T represents a unit time; $P_{BBU}$ is a unit power consumption of a BBU port; $Y_{i,k}$ is a binary variable, wherein if a $j^{th}$ BBU port in an $i^{th}$ base station is occupied, $Y_{i,k}$ is 1, or otherwise, $Y_{i,k}$ is 0; A is a set of base station areas; i is an index of an $i^{th}$ area in a base station; j is an index of a $j^{th}$ RRH; and k is an index of a $k^{th}$ BBU port; and the constraints of the objective function comprise: (1) it is ensured that a bandwidth traffic requirement of the traffic demand is less than or equal to a capacity of a $j^{th}$ RRH in an $i^{th}$ base station; (2) it is ensured that a bandwidth traffic requirement of the traffic demand is less than or equal to a capacity of a $k^{th}$ BBU port in an $i^{th}$ base station; (3) a bandwidth traffic requirement of the traffic demand is less than or equal to a capacity provided by a RRH from a source node area (i=s) to a destination node area (i=d); (4) a bandwidth traffic requirement of the traffic demand is less than or equal to a capacity provided by a BBU port from a source node area (i=s) to a destination node area (i=d); (5) it is ensured on a source node s or a destination node d that a bandwidth traffic requirement of each traffic demand (s, d) is less than or equal to a capacity provided by a RRH in a $j^{th}$ base station; and (6) it is ensured on a source node s or a destination node d that a bandwidth traffic requirement of each traffic demand (s, d) is less than or equal to a capacity provided by the $k^{th}$ BBU port.

Preferably, the operation module includes a data input unit, which is configured to acquire an input constant, a variable index, and a variable parameter of the objective function; and solve the objective function based on the input constant, the variable index, and the variable parameter.

The energy consumption optimization method and system for a radio access spectrum-flexible optical network in the present invention have the following beneficial effects:

Radio network traffic enters a BBU pool through a RRH in an aggregated manner. By means of a traffic grooming method, traffic flow is routed to a spectrum-flexible optical network, to enable a radio access spectrum-flexible optical network to provide a service. By means of the traffic grooming method, the number of RRHs and the number of BBU ports of a radio access spectrum-flexible optical network are reduced, so that the energy consumption of the network is reduced.

DETAILED DESCRIPTION OF THE PREFERRED EMBODIMENTS

To enable a person skilled in the art to better understand the technical solutions of the present invention, the present invention is further illustrated below in detail with reference to the accompanying drawings and specific implementations.

An architecture of a radio (5G C-RAN) access spectrum-flexible optical network:

A radio access spectrum-flexible optical network includes a RRH with a front-end functionality, an optical radio fronthaul/backhaul network, a BBU pool, and a spectrum-flexible optical network. A RRH antenna is installed at a local cell base station and is connected to different mobile devices via a radio network. The BBU pool centralizedly manages BBUs. These BBUs are mainly connected to the RRHs by the optical radio fronthaul/backhaul network. Optical-electrical-optical (O-E-O) conversion is required in an intermediate stage. In addition, one BBU port is connected to one RRH. In this way, each BBU-RRH pair exchanges radio data and optical data via a common public radio interface (CPRI). Because traffic demands dynamically change between the RRHs and the BBUs, data needs to be aggregated at the RRHs, and traffic grooming needs to be performed at the BBU ports. Data traffic is transmitted to the spectrum-flexible optical network through the BBU port.

For energy consumption components of a radio access spectrum-flexible optical network, in the architecture of radio access spectrum-flexible optical network, energy consumption components of the network mainly include a RRH, a BBU, an O-E-O converter, and a stationary device. Herein, the O-E-O converter and the stationary device are not considered for the reason that there are many methods for reducing the energy consumption of the O-E-O converter and the energy consumption overhead of the stationary device is not related to the data traffic. However, the operation conditions of devices such as the RRHs and the BBUs, in particular, the device cooling, needs to be ensured in the network. Therefore, in the radio access spectrum-flexible optical network, only the energy consumption of the RRHs and the BBUs is considered. The energy consumption herein is power consumption within a unit time (for example, a second). The following expression is used to represent the power consumption of the radio access spectrum-flexible optical network:

$$PC = N_{RRH} \times P_{RRH} + N_{BBU} \times P_{BBU}$$

Herein, $N_{RRH}$ and $N_{BBU}$ denote the number of RRHs and the number of BBU ports respectively. $P_{RRH}$ and $P_{BBU}$ are the unit power consumption of a RRH and a BBU port respectively. If a unit time is considered, for example, a unit time is a second, the energy consumption value and the power consumption value of the radio access spectrum-flexible optical network are the same.

Embodiment 1

Figure 1:
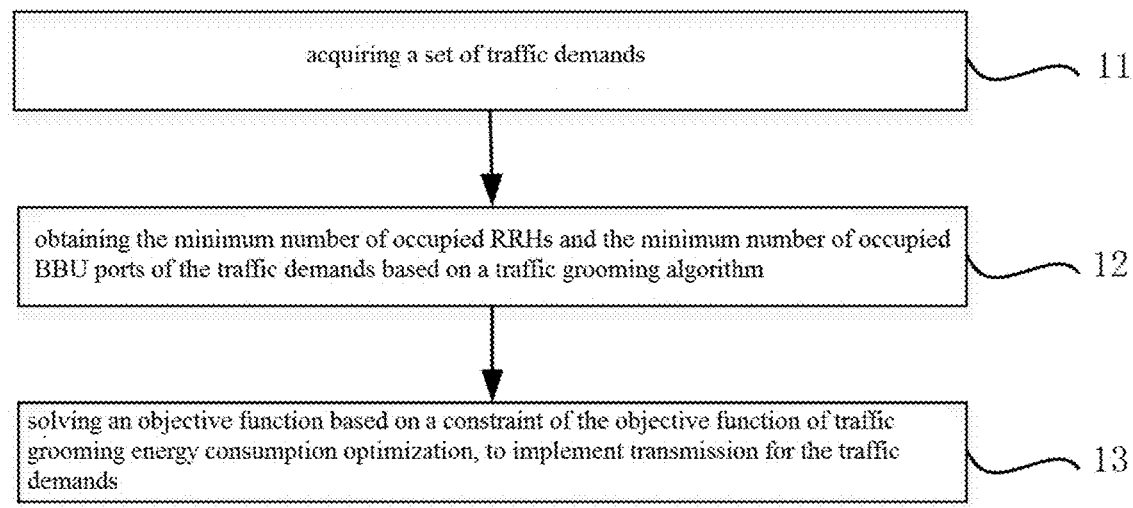
FIG. 1 is a flowchart of an energy consumption optimization method for a radio access spectrum-flexible optical network according to Embodiment 1 of the present invention.
Figure 2:
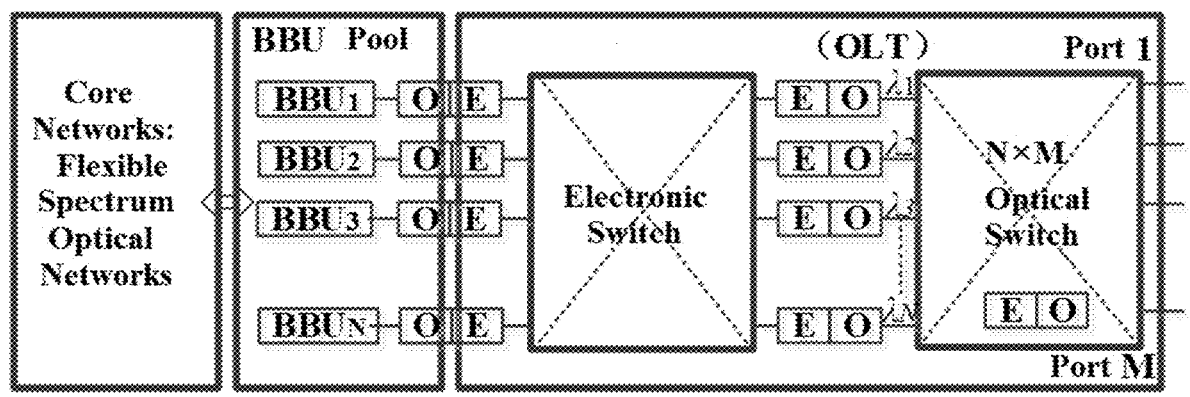
FIG. 2 is a block diagram of an energy consumption optimization system for a radio access spectrum-flexible optical network according to Embodiment 1 of the present invention.

Referring to FIG. 1 and FIG. 2, this embodiment provides an energy consumption optimization method for a radio access spectrum-flexible optical network, including the following steps.

Step 11: acquiring a set of traffic demands;

Step 12: obtaining the minimum number of occupied RRHs and the minimum number of occupied BBU ports of the traffic demands based on a traffic grooming algorithm; and Step 13: solving an objective function based on a constraint of the objective function of traffic grooming energy consumption optimization, to implement transmission for the traffic demands.

An expression of the objective function is:

Minimize $\Sigma_{i \in A} \Sigma_{j \in R} P_{RRH} X_{i,j} \cdot T + \Sigma_{i \in A} \Sigma_{k \in B} P_{BBU} \cdot Y_{i,k} \cdot T$,
wherein in the expression, $P_{RRH}$ is a unit power consumption of a RRH; $X_{i,j}$ is a binary variable, wherein if a $j^{th}$ RRH in an $i^{th}$ base station is occupied, $X_{i,j}$ is 1, or otherwise, $X_{i,j}$ is 0; T represents a unit time; $P_{BBU}$ is a unit power consumption of a BBU port; $Y_{i,k}$ is a binary variable, wherein if a $j^{th}$ BBU port in an $i^{th}$ base station is occupied, $Y_{i,k}$ is 1, or otherwise, $Y_{i,k}$ is 0; A is a set of base station areas; i is an index of an $i^{th}$ area in a base station; j is an index of a $j^{th}$ RRH; and k is an index of a $k^{th}$ BBU port; and the constraints of the objective function include:

(1) it is ensured that a bandwidth traffic requirement of the traffic demand is less than or equal to a capacity of a $j^{th}$ RRH in an $i^{th}$ base station, the expression is as follows:

$RRHC_{i,j} \cdot X_{i,j} \geq \Sigma_{(s,d) \in CR} \Lambda^{s,d} x_{i,j}^{s,d}$, $\forall i \in A, j \in R$.

(2) it is ensured that a bandwidth traffic requirement of the traffic demand is less than or equal to a capacity of a $k^{th}$ BBU port in an $i^{th}$ base station, the expression is as follows:

$BBUC_{i,k} \cdot Y_{i,k} \geq \Sigma_{(s,d) \in CR} \Lambda^{s,d} \cdot y_{i,d}^{s,d}$, $\forall i \in A, k \in B$.

(3) a bandwidth traffic requirement of the traffic demand is less than or equal to a capacity provided by a RRH from a source node area (i=s) to a destination node area (i=d), the expression is as follows:

$$\sum_{(s,d) \in CR} \Lambda^{s,d} \leq \sum_{(s,d) \in CR} \sum_{i \in A} \sum_{j \in R} RRHC_{i,j} \cdot x_{i,j}^{s,d}, \forall i = s$$

$$\sum_{(s,d) \in CR} \Lambda^{s,d} \leq \sum_{(s,d) \in CR} \sum_{i \in A} \sum_{j \in R} RRHC_{i,j} \cdot x_{i,j}^{s,d}, \forall i = d.$$

(4) a bandwidth traffic requirement of the traffic demand is less than or equal to a capacity provided by a BBU port from a source node area (i=s) to a destination node area (i=d), the expression is as follows:

$$\sum_{(s,d) \in CR} \Lambda^{s,d} \leq \sum_{(s,d) \in CR} \sum_{i \in A} \sum_{k \in B} BBUC_{i,k} \cdot y_{i,k}^{s,d}, \forall i = s$$

$$\sum_{(s,d) \in CR} \Lambda^{s,d} \leq \sum_{(s,d) \in CR} \sum_{i \in A} \sum_{k \in B} BBUC_{i,k} \cdot y_{i,k}^{s,d}, \forall i = d.$$

(5) it is ensured on a source node s or a destination node d that a bandwidth traffic requirement of each traffic demand (s, d) is less than or equal to a capacity provided by a RRH in a $j^{th}$ base station, the expression is as follows:

$$\Lambda^{s,d} \leq \sum_{j \in R} RRHC_{s,j} \cdot x_{s,j}^{s,d}, \forall (s, d) \in CR$$

$$\Lambda^{s,d} \leq \sum_{j \in R} RRHC_{d,j} \cdot x_{d,j}^{s,d}, \forall (s, d) \in CR.$$

(6) it is ensured on a source node s or a destination node d that a bandwidth traffic requirement of each traffic demand (s, d) is less than or equal to a capacity provided by the $k^{th}$ BBU port, the expression is as follows:

$$\Lambda^{s,d} \leq \sum_{k \in B} BBUC_{s,j} \cdot y_{s,k}^{s,d}, \forall (s, d) \in CR$$

$$\Lambda^{s,d} \leq \sum_{k \in B} BBUC_{d,j} \cdot y_{d,k}^{s,d}, \forall (s, d) \in CR.$$

Preferably, the obtaining the minimum number of occupied RRHs and the minimum number of occupied BBU ports of the traffic demands based on a traffic grooming algorithm includes:

collecting and aggregating traffic information according to a traffic requirement of each traffic demand in a local cell base station; and dividing the aggregated traffic information into different data rates, wherein the data rates are the same as the rates carried by RRHs with RF front-end functionalities in a one-to-one correspondence.

In the solution, each RRH with a front-end functionality can be properly matched, thereby facilitating to reduce the number of RRHs with a front-end functionality in the local cell base station.

Preferably, when the traffic flow of a RRH passes through an optical radio fronthaul/backhaul network, N×M optical switches of an optical line terminal (OLT) are used to convert traffic flow from an optical signal into an electrical signal, that is, performing O-E conversion, and an electric switch is then used to perform traffic grooming to convert the electrical signal into the optical signal. In this way, O-E-O conversion is performed on traffic flow of the local cell base station in an OLT, and the traffic flow is routed to a BBU port and eventually flows to the spectrum-flexible optical network.

Preferably, one BBU port is connected to one RRH. In this way, each BBU-RRH pair exchanges radio data and optical data via CPRI. Because traffic demands dynamically changes between the RRHs and the BBUs, data needs to be aggregated at the RRHs, and the traffic grooming needs to be performed at the BBU ports. A traffic grooming method is used to minimize the number of RRHs and the number of BBU ports in the network, so that data traffic is transmitted to the spectrum-flexible optical network through the BBU ports.

Preferably, Step 13 includes:

acquiring an input constant, a variable index, and a variable parameter of the objective function; and solving the objective function based on the input constant, the variable index, and the variable parameter, wherein the input constant includes:

1) $P_{RRH}$ is a unit power consumption of a RRH;

2) $P_{BBU}$ is a unit power consumption of a BBU port;
3) $RRHC_{i,j}$ is a capacity of a $j^{th}$ RRH in an $i^{th}$ area;
4) $BBUC_{i,k}$ is a capacity of a $k^{th}$ BBU port in an $i^{th}$ area;
5) $\Lambda^{s,d}$ is the traffic flow from a source node s to a destination node d;
6) (s, d) is a traffic demand from a source node s to a destination node d, wherein s≠d;
7) CR is a given set of traffic demands;
8) A is a set of base station areas;
9) R is a set of RRHs in one base station;
10) B is a set of BBU ports in one area; and
11) T represents a unit time;
the variable index includes;
1) i is an index of an $i^{th}$ area in a base station;
2) j is an index of a $j^{th}$ RRH;
3) k is an index of a $k^{th}$ BBU port; and
4) s and d are indices of a source node s and a destination node d for a traffic demand; and
the variable parameter includes:
1) $X_{i,j}$ is a binary variable, wherein if a $j^{th}$ RRH in an $i^{th}$ base station is occupied, $X_{i,j}$ is 1, or otherwise, $X_{i,j}$ is 0;
2) $Y_{i,k}$ is a binary variable, wherein if a $j^{th}$ BBU port in an $i^{th}$ base station is occupied, $Y_{i,k}$ is 1, or otherwise, $Y_{i,k}$ is 0;
3) $x_{i,j}^{s,d}$ is a binary variable, wherein if a traffic demand (s, d) occupies a $j^{th}$ RRH in an $i^{th}$ base station, $x_{i,j}^{s,d}$ is 1, or otherwise, $x_{i,j}^{s,d}$ is 0; and
4) $y_{i,k}^{s,d}$ is a binary variable, wherein if a traffic demand (s, d) occupies the $k^{th}$ BBU port in an $i^{th}$ base station, $y_{i,k}^{s,d}$ is 1, or otherwise, $y_{i,k}^{s,d}$ is 0.

Embodiment 2

This embodiment provides an energy consumption optimization system for a radio access spectrum-flexible optical network, including:
a traffic demand acquisition module, configured to acquire a set of traffic demands;
an operation module, configured to obtain the minimum number of occupied remote radio heads (RRHs) and the minimum number of occupied baseband unit (BBU) ports of the traffic demands based on a traffic grooming algorithm; and
a transmission module, configured to solve an objective function based on the constraint of the objective function of traffic grooming energy consumption optimization, to implement transmission for the traffic demands, wherein
an expression of the objective function is:

Minimize $\Sigma_{i \in A} \Sigma_{j \in R} P_{RRH} \cdot X_{i,j} \cdot T + \Sigma_{i \in A} \Sigma_{k \in B} P_{BBU} \cdot Y_{i,k} \cdot T$,
wherein in the expression, $P_{RRH}$ is a unit power consumption of a RRH; $X_{i,j}$ is a binary variable, wherein if a $j^{th}$ RRH in an $i^{th}$ base station is occupied, $X_{i,j}$ is 1, or otherwise, $X_{i,j}$ is 0; T represents a unit time; $P_{BBU}$ is a unit power consumption of a BBU port; $Y_{i,k}$ is a binary variable, wherein if a $j^{th}$ BBU port in an $i^{th}$ base station is occupied, $Y_{i,k}$ is 1, or otherwise, $Y_{i,k}$ is 0; A is a set of base station areas; i is an index of an $i^{th}$ area in a base station; j is an index of a $j^{th}$ RRH; and k is an index of a $k^{th}$ BBU port; and
the constraints of the objective function include: (1) it is ensured that a bandwidth traffic requirement of the traffic demand is less than or equal to a capacity of a $j^{th}$ RRH in an $i^{th}$ base station; (2) it is ensured that a bandwidth traffic requirement of the traffic demand is less than or equal to a capacity of a $k^{th}$ BBU port in an $i^{th}$ base station; (3) a bandwidth traffic requirement of the traffic demand is less than or equal to a capacity provided by a RRH from a source node area (i=s) to a destination node area (i=d); (4) a bandwidth traffic requirement of the traffic demand is less than or equal to a capacity provided by a BBU port from a source node area (i=s) to a destination node area (i=d); (5) it is ensured on a source node s or a destination node d that a bandwidth traffic requirement of each traffic demand (s, d) is less than or equal to a capacity provided by a RRH in a $j^{th}$ base station; and (6) it is ensured on a source node s or a destination node d that a bandwidth traffic requirement of each traffic demand (s, d) is less than or equal to a capacity provided by the $k^{th}$ BBU port.

Preferably, the operation module includes:
a data input unit, which is configured to acquire an input constant, a variable index, and a variable parameter of the objective function; and solve the objective function based on the input constant, the variable index, and the variable parameter.

The system in the foregoing solution can perform the foregoing method, and therefore the power consumption of RRHs and BBU ports can be reduced.

It should be understood that the foregoing embodiments are only exemplary implementations used for illustrating the principle of the present invention. However, the present invention is not limited thereto. For a person of ordinary skill in the art, various modifications and improvements may be made without departing from the spirit and essence of the present invention. These improvements and modifications are also deemed as falling within the protection scope of the present invention.

What is claimed is:

1. An energy consumption optimization method for a radio access spectrum-flexible optical network, comprising:
acquiring a set of traffic demands;
obtaining the minimum number of occupied remote radio heads (RRHs) and the minimum number of occupied baseband unit (BBU) ports of the traffic demands based on a traffic grooming algorithm; and
solving an objective function based on the constraints of the objective function of traffic grooming energy consumption optimization, to implement transmission for the traffic demands, wherein
an expression of the objective function is:
Minimize $\Sigma_{i \in A} \Sigma_{j \in R} P_{RRH} \cdot X_{i,j} \cdot T + \Sigma_{i \in A} \Sigma_{k \in B} P_{BBU} \cdot Y_{i,k} \cdot T$,
wherein $P_{RRH}$ is a unit power consumption of a RRH; $X_{i,j}$ is a binary variable, wherein if a $j^{th}$ RRH in an $i^{th}$ base station is occupied, $X_{i,j}$ is 1, or otherwise, $X_{i,j}$ is 0; T represents a unit time; $P_{BBU}$ is a unit power consumption of a BBU port; $Y_{i,k}$ is a binary variable, wherein if a $j^{th}$ BBU port in an $i^{th}$ base station is occupied, $Y_{i,k}$ is 1, or otherwise, $Y_{i,k}$ is 0; A is a set of base station areas; i is an index of an $i^{th}$ area in a base station; j is an index of a $j^{th}$ RRH; and k is an index of a $k^{th}$ BBU port; and
the constraints of the objective function comprise: (1) ensuring that a bandwidth traffic requirement of the traffic demand is less than or equal to a capacity of a $j^{th}$ RRH in an $i^{th}$ base station; (2) ensuring that a bandwidth traffic requirement of the traffic demand is less than or equal to a capacity of a $k^{th}$ BBU port in an $i^{th}$ base station; (3) a bandwidth traffic requirement of the traffic demand is less than or equal to a capacity provided by a RRH from a source node area (i=s) to a destination node area (i=d); (4) a bandwidth traffic requirement of the traffic demand is less than or equal to a capacity provided by a BBU port from a source node area (i=s) to a destination node area (i=d); (5) ensuring on a source node s or a destination node d that a bandwidth traffic requirement of each traffic demand (s, d) is less than or equal to a capacity provided by a RRH in a $j^{th}$ base station; and (6) ensuring on a source node s or a destination node d that a bandwidth traffic requirement of each traffic demand (s, d) is less than or equal to a capacity provided by the $k^{th}$ BBU port, wherein the obtaining the minimum number of occupied RRHs and the minimum number of occupied BBU ports of the traffic demands based on a traffic grooming algorithm comprises:

collecting and aggregating traffic information according to a traffic requirement of each traffic demand in a local cell base station; and dividing the aggregated traffic information into different data rates, wherein the data rates are the same as the rates carried by RRHs with front-end functionalities in a one-to-one correspondence; and wherein the solving an objective function based on the constraints of the objective function of traffic grooming energy consumption optimization comprises:

acquiring an input constant, a variable index, and a variable parameter of the objective function; and solving the objective function based on the input constant, the variable index, and the variable parameter, wherein the input constant comprises:

1) $P_{RRH}$ is a unit power consumption of a RRH;
2) $P_{BBU}$ is a unit power consumption of a BBU port;
3) $RRHC_{i,j}$ is a capacity of a $j^{th}$ RRH in an $i^{th}$ area;
4) $BBUC_{i,k}$ is a capacity of a $k^{th}$ BBU port in an $i^{th}$ area;
5) $\Lambda^{s,d}$ is the traffic flow from a source node s to a destination node d;
6) (s, d) is a traffic demand from a source node s to a destination node d; wherein s≠d,
7) CR is a given set of traffic demands;
8) A is a set of base station areas;
9) R is a set of RRHs in one base station;
10) B is a set of BBU ports in one area; and
11) T represents a unit time;

the variable index comprises:
1) i is an index of an $i^{th}$ area in a base station;
2) j is an index of a $j^{th}$ RRH;
3) k is an index of a $k^{th}$ BBU port; and
4) s and d are indices of a source node s and a destination node d for a traffic demand; and the variable parameter comprises:
1) $X_{i,j}$ is a binary variable, wherein if a $j^{th}$ RRH in an $i^{th}$ base station is occupied, $X_{i,j}$ is 1, or otherwise, $X_{i,j}$ is 0;
2) $Y_{j,k}$ is a binary variable, wherein if a $j^{th}$ BBU port in an $i^{th}$ base station is occupied, $Y_{i,k}$ is 1, or otherwise, $Y_{i,k}$ is 0;
3) $x_{i,j}^{s,d}$ is a binary variable, wherein if a traffic demand (s, d) occupies a $j^{th}$ RRH in an $i^{th}$ base station, $x_{i,j}^{s,d}$ is 1, or otherwise, $x_{i,j}^{s,d}$ is 0; and
4) $y_{i,k}^{s,d}$ is a binary variable, wherein if a traffic demand (s, d) occupies the $k^{th}$ BBU port in an $i^{th}$ base station, $y_{i,k}^{s,d}$ is 1, or otherwise, $x_{i,k}^{s,d}$ is 0.

2. An energy consumption optimization system for a radio access spectrum-flexible optical network, comprising:

a traffic demand acquisition module, configured to acquire a set of traffic demands;

an operation module, configured to obtain the minimum number of occupied remote radio heads (RRHs) and the minimum number of occupied baseband unit (BBU) ports of the traffic demands based on a traffic grooming algorithm; and a transmission module, configured to solve an objective function based on the constraints of the objective function of traffic grooming energy consumption optimization, to implement transmission for the traffic demands, wherein an expression of the objective function is:

Minimize $\Sigma_{i \in A} \Sigma_{j \in R} P_{RRH} \cdot X_{i,j} \cdot T + \Sigma_{i \in A} \Sigma_{k \in B} P_{BBU} \cdot Y_{i,k} \cdot T$, wherein $P_{RRH}$ is a unit power consumption of a RRH; $X_{i,j}$ is a binary variable, wherein if a $j^{th}$ RRH $i^{th}$ base station is occupied, $X_{i,j}$ is 1, or otherwise, $X_{i,j}$ is 0; T represents a unit time; $P_{BBU}$ is a unit power consumption of a BBU port; $Y_{i,k}$ is a binary variable, wherein if a $j^{th}$ BBU port in an $i^{th}$ base station is occupied, $Y_{i,k}$ is 1, or otherwise, $Y_{i,k}$ is 0; A is a set of base station areas; i is an index of an $i^{th}$ area in a base station; j is an index of a $j^{th}$ RRH; and k is an index of $k^{th}$ BBU port; and the constraints of the objective function comprise: (1) ensuring ensured that a bandwidth traffic requirement of the traffic demand is less than or equal to a capacity of a $j^{th}$ RRH in an $i^{th}$ base station; (2) ensuring that a bandwidth traffic requirement of the traffic demand is less than or equal to a capacity of $k^{th}$ BBU port in an $i^{th}$ base station; (3) a bandwidth traffic requirement of the traffic demand is less than or equal to a capacity provided by a RRH from a source node area to a destination node area; (4) a bandwidth traffic requirement of the traffic demand is less than or equal to a capacity provided by a BBU port from a source node area to a destination node area; (5) ensuring on a source node s or a destination node d that a bandwidth traffic requirement of each traffic demand is less than or equal to a capacity provided by a RRH in a $j^{th}$ base station; and (6) ensuring on a source node s or a destination node d that a bandwidth traffic requirement of each traffic demand is less than or equal to a capacity provided by the $k^{th}$ BBU port, wherein the operation module comprises:

a data input unit, configured to:

acquire an input constant, a variable index, and a variable parameter of the objective function; and solve the objective function based on the input constant, the variable index, and the variable parameter; and wherein the energy consumption optimization system further comprises N×M optical switches and an electric switch, the N×M optical switches are used to perform an O-E conversion, and the electric switch is used to convert the electrical signal into the optical signal.

* * * * *